Patented May 8, 1928.

1,668,853

UNITED STATES PATENT OFFICE.

BERNARD LONG, OF PARIS, FRANCE, ASSIGNOR TO SOCIÉTÉ ANONYME DES MANUFACTURES DES GLACES & PRODUITS CHIMIQUES DE SAINT-GOBAIN, CHAUNY & CIREY, OF PARIS, FRANCE.

PROCESS OF UNITING VITREOUS PIECES.

No Drawing.   Application filed January 12, 1926. Serial No. 80,838.

My invention has for its object to provide means whereby pieces of vitreous substance, such as glass, may be united, without the application of such heat as to cause the welding of the pieces, with the production of a joint having greater tensile strength than that of glass itself. I have discovered that this can be accomplished by the proper use of a synthetic resin such as a phenol and formaldehyde condensation product, for instance bakelite.

In carrying out my invention, the surfaces to be joined are carefully finished to fit one against the other throughout the joint to be made. However, in so finishing the surfaces I avoid polishing the same, although the surfaces should be relatively smooth. I have found that a surface produced by grinding with the finest emery is suitable for the joint hereinafter described, whereas a polished surface finished with rouge is not suitable. I paint the two surfaces so prepared with a solution of a synthetic resin such as a phenol and formaldehyde condensation product, for instance bakelite dissolved in a suitable solvent such as ethyl or methyl alcohol, or acetone, etc., the former being preferred. The solution should be a concentrated one so that the said synthetic resin forms 60 to 80 per cent thereof, and may be applied by a spatula and at a temperature from 30 to 40 degrees C. and in the smallest quantities that will completely cover such surfaces. This temperature increases the fluidity of the otherwise viscous concentrated solution and permits thinner spreading. The pieces to be joined should themselves be heated prior to the application of the said synthetic resin thereto to a temperature of about 80 degrees C. and after the surfaces have been coated, as before stated, and before they are united, they should be maintained at a temperature of about 80 degrees C. for some minutes to drive off the solvent, leaving on each surface only a thin film of said synthetic resin.

Under certain conditions, in lieu of dissolving the said synthetic resin, the said synthetic resin may be rendered fluid by the aid of heat alone and applied in this state, but the process first above indicated produces a superior result due to the fact that the film thereby produced is thinner.

The surfaces thus coated are now brought together under a high pressure, for instance a pressure amounting to 5 kilograms per square centimeter, and while under this pressure the joint so made is heated, the temperature being gradually raised to 150 degrees C., which temperature is maintained for several days, after which the pieces are allowed to cool slowly.

A joint produced as above is characterized by the fact that the two parts of glass are brought into such close contact one with the other that apparently their surfaces are in actual contact, the eye being unable to see the joint between them, the pieces being seemingly homogeneous with each other.

Such film of said synthetic resin as exists between the surface is so thin that the several particles forming it are in adhesion to the opposite glass surfaces so that the strength of the joint is not limited by the cohesion of said synthetic resin particles as is shown by the fact that a joint made as above described has a tensile strength per square centimeter much in excess of the tensile strength per square centimeter of the glass itself, whereas said synthetic resin has a tensile strength less than the glass. Thus the limiting factor in the strength of this joint is the adhesion between said synthetic resin and glass and not the cohesion of the said synthetic resin to said synthetic resin. Moreover, the joint is practically transparent and colorless in spite of the fact that the said synthetic resin itself when viewed in substantial thickness is colored.

Having thus described my invention what I desire to claim and secure by Letters Patent is:

1. A process of uniting vitreous surfaces which consists in accurately fitting the surfaces to be joined, and producing thereon a smoothness such as produced by grinding with fine emery, applying to the said surfaces while hot a thin film of heated synthetic resin such as a phenol and formaldehyde condensation product, for instance, and uniting the surfaces under pressure and heat.

2. A process of uniting vitreous surfaces which consists in accurately fitting the surfaces to be joined, and producing thereon a smoothness such as produced by grinding with fine emery, applying to the said surfaces while hot a concentrated heated solution of synthetic resin such as a phenol and formaldehyde condensation product, for instance driving by heat the solvent from said surfaces, and uniting the surfaces under pressure and heat.

In testimony whereof I hereunto affix my signature.

BERNARD LONG.